US012585491B2

(12) United States Patent
Hellwig et al.

(10) Patent No.: US 12,585,491 B2
(45) Date of Patent: Mar. 24, 2026

(54) PROCESSING OF INTERRUPTS

(71) Applicant: Infineon Technologies AG, Neubiberg (DE)

(72) Inventors: Frank Hellwig, Wunstorf (DE); Sandeep Vangipuram, Bristol (GB)

(73) Assignee: Infineon Technologies AG, Neubiberg (DE)

( * ) Notice: Subject to any disclaimer, the term of this patent is extended or adjusted under 35 U.S.C. 154(b) by 354 days.

(21) Appl. No.: 18/302,053

(22) Filed: Apr. 18, 2023

(65) Prior Publication Data

US 2023/0342187 A1     Oct. 26, 2023

(30) Foreign Application Priority Data

Apr. 20, 2022     (DE) ..................... 10 2022 109 559.2

(51) Int. Cl.
G06F 9/48         (2006.01)
G06F 13/28       (2006.01)
(52) U.S. Cl.
CPC ............ G06F 9/4818 (2013.01); G06F 13/28 (2013.01)

(58) Field of Classification Search
None
See application file for complete search history.

(56) References Cited

U.S. PATENT DOCUMENTS

| | | | |
|---|---|---|---|
| 6,463,492 B1 | 10/2002 | Engfer et al. | |
| 8,234,431 B2 | 7/2012 | Kruglick | |
| 2015/0286596 A1* | 10/2015 | Hellwig | G06F 13/28 |
| | | | 710/308 |
| 2017/0315944 A1* | 11/2017 | Mayer | G06F 13/24 |
| 2021/0103464 A1* | 4/2021 | Wirrer | G06F 9/546 |

* cited by examiner

*Primary Examiner* — Farley Abad
*Assistant Examiner* — Dayton Lewis-Taylor
(74) *Attorney, Agent, or Firm* — Eschweiler & Potashnik, LLC

(57) ABSTRACT

It is suggested to process an interrupt event as follows: (i) receiving an interrupt event at a service request node; (ii) providing, by the service request node, an interrupt service request based on the interrupt event, and a security information; and (iii) forwarding the interrupt service request to an interrupt service provider.

20 Claims, 3 Drawing Sheets

PROCESSING OF INTERRUPTS

REFERENCE TO RELATED APPLICATIONS

This application claims priority to German Patent Application 10 2022 109 559.2, filed on Apr. 20, 2022. The contents of the above-referenced Patent Application is hereby incorporated by reference in its entirety.

BACKGROUND

Applications of different domains, e.g., secure applications and non-secure applications may use a common hardware platform. Interrupt events (or exceptions) may be generated by each application. However, in existing solutions interrupt processing in the secure domain may be impacted by the non-secure domain.

SUMMARY

One objective is to improve existing solutions of handling interrupts and in particular enable an encapsulated interrupt processing of secure applications that utilize a shared physical resource.

A method is suggested for processing of an interrupt event, the method comprising:

receiving an interrupt event at a service request node,
  compiling, by the service request node, an interrupt service request based on the interrupt event, and a security information, and
  forwarding the interrupt service request to an interrupt service provider.

The interrupt event may comprise an interrupt, a DMA, an exception or the like. The service request node can be configured by a master agent of the interrupt service provider. Such configuration may comprise setting the security information. The security information may be a security bit (also referred to herein as CS-bit). For example, CS=1 may indicate that the master agent operates in the secure domain and wants the service request node to also be set up in the secure domain. Hence, the master agent may allocate the service request node such that the interrupt events that arrive at this service request node are treated as secure and will be forwarded also to this particular secure master agent. The master agent operating in the secure domain needs to be authenticated as secure master in order to configure the interrupt service node accordingly.

On the other hand, CS=0 may indicate that a master agent operates in the non-secure domain. This master-agent sets up the service request node to also operate in the non-secure domain. Hence, the master agent may allocate the service request node such that the interrupt events that arrive at this service request node are treated as non-secure and will be forwarded also to this particular non-secure master agent at the interrupt service provider.

Therefore, any service request node that has been set up operates exclusively either in the secure domain or in the non-secure domain.

The utilization of the secure information allows that a common hardware platform can be used for secure applications and non-secure applications. Differentiating the secure domain and the non-secure domain also with regard to the configuring master agent enables an efficient and flexible access protection mechanism.

According to an embodiment, the security information of the service request node is configured by a master agent.

The master agent may be a master agent of the interrupt service provider or of a debug interface.

According to an embodiment, the security information indicates whether the service request node operates in a secure domain,
  the service request node operates in a non-secure domain, or
  the service request node is not yet configured, and the configuration in the secure domain can only be conducted by a master agent that has been authenticated as a secure master agent. The configuration may comprise setting, re-configuring, or clearing the service request node.

As an option, a predefined action, e.g., alarm or the like, may be triggered if there is a configuration attempt in the secure domain by a non-secure master agent or in the non-secure domain by as secure master agent.

According to an embodiment, the configuration in the non-secure domain can only be conducted by a master agent that is not a secure master agent.

It is noted that only a secure master agent may be able to assign at least one SRN to a secure application. This at least one SRN (assigned to the secure application) can only be re-configured by the secure master agent.

Accordingly, only the non-secure master agent can assign at least one SRN to a non-secure application. This at least one SRN (assigned to the non-secure application) can only be re-configured by the non-secure master agent.

According to an embodiment, the interrupt service request is further compiled based on an additional information that may include at least one of the following:

an address information that allows identifying the interrupt service provider, in particular
  a master agent of the interrupt service provider,
  a processor,
  a virtual machine,
  a MA channel or a DMA channel group,
  a priority information.

According to an embodiment, the interrupt service provider only processes the interrupt if the security information of the interrupt service request corresponds to an internal security information.

The internal security information may be a security information of the master agent that has been utilized to configure the service request node.

In an exemplary use-case, the ISP may be a DMA. A DMA channel may be configured to be either "secure" or "non-secure". This corresponds to a type of security. The SR may in particular be processed only if the type of security of a DMA for this channel matches the configuration.

In an alternative use-case scenario, the ISP may be a CPU comprising VMs, wherein each VM is configured to be either "secure" or "non-secure". The SR may in particular be processed only if the type of security (e.g., secure or non-secure) matches the configuration of the addressed VM.

According to an embodiment, an interrupt event is associated with one service request node and the service request node is associated only with this interrupt.

Further, a device is suggested that is arranged to conduct the steps of the method as described herein.

It is noted that said device can comprise at least one, in particular several means that are arranged to execute the steps of the method described herein. The means may be logically or physically separated; in particular several logically separate means may be combined in at least one physical unit. The device may comprise at least one of the following: a processor, a microcontroller, a hard-wired circuit, an ASIC, an FPGA, or a logic device.

Further, a computer program product is provided, which is directly loadable into a memory of a digital computer, comprising software code portions for performing the steps of the method as described herein.

In addition, the problem stated above is solved by a computer-readable medium, e.g., storage of any kind, having computer-executable instructions adapted to cause a computer system to perform the method as described herein.

BRIEF DESCRIPTION OF DRAWINGS

Embodiments are shown and illustrated with reference to the drawings. The drawings serve to illustrate the basic principle, so that only aspects necessary for understanding the basic principle are illustrated. The drawings are not to scale. In the drawings the same reference characters denote like features.

DETAILED DESCRIPTION

An existing multi-core microcontroller unit (multi-core MCU) may comprise several functions or units, e.g., several CPUs, communication interfaces, DMA functions, system functions like general purpose input output (GPIO) functions, interrupt systems, etc. These functions or units may be included on an integrated circuit, which typically includes a semiconductor substrate in which semiconductor devices such as transistors are disposed, and an interconnect structure including copper wires and vias that connect the semiconductors devices to one another to achieve a circuit configuration.

To support software encapsulation, virtualization and multi-application integration on a single MCU, groups of functions may be configured to form a virtual sub-system which can be protected against unauthorized reading and writing by any other sub-system. Such protection may be achieved by configurable interconnect access protection mechanisms.

An interrupt (IRQ) is referred to as a request from an interrupt source that is directed to an application. The application may be run on an interrupt service provider (ISP). The interrupt source may trigger at least one interrupt event. The ISP comprises a function that is able to react on at least one interrupt service request (SR). This function may be regarded as a chip resource, e.g., a CPU, a DMA or the like. This chip resource is able to react in response to the service request.

Figure 1:
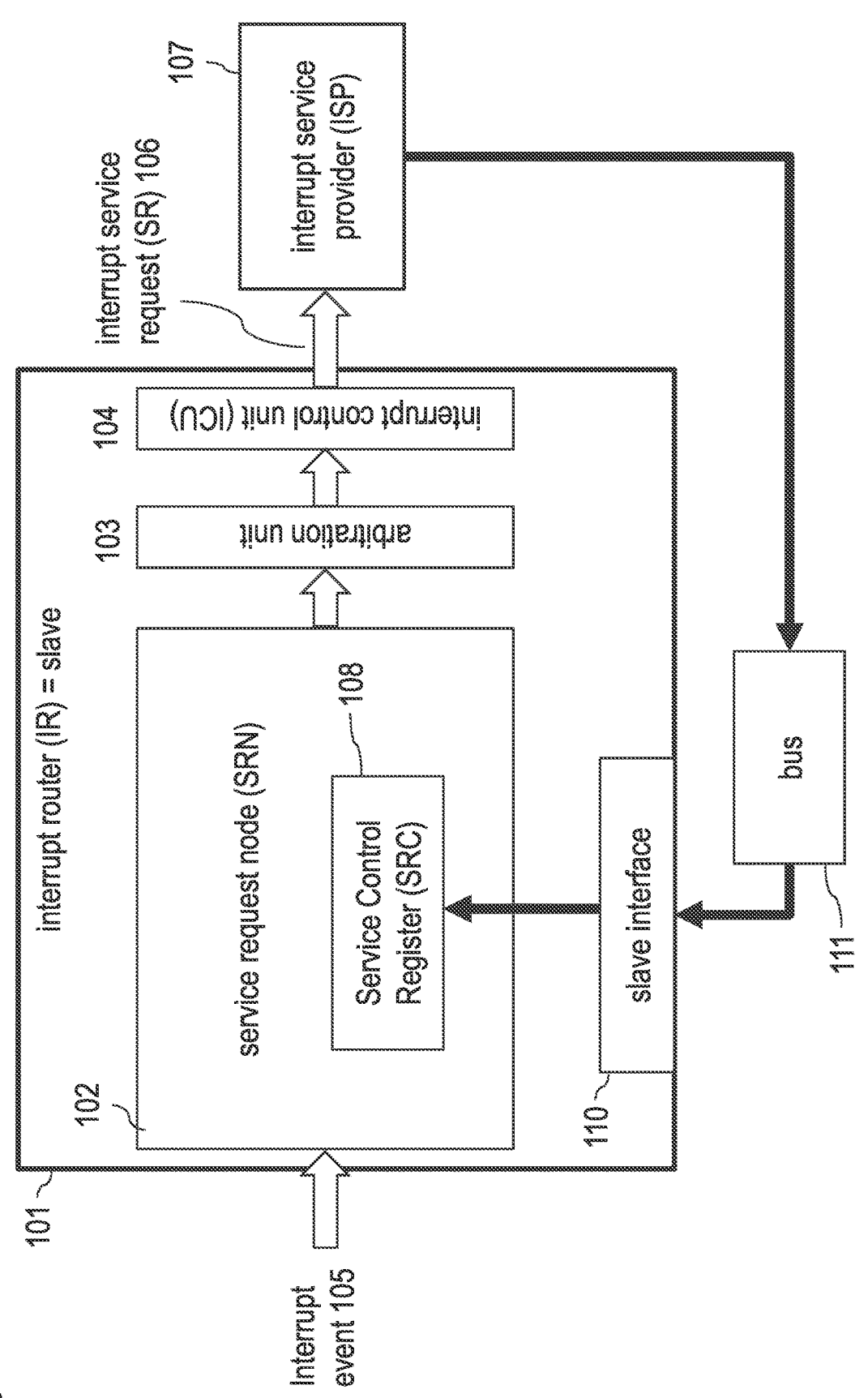
FIG. 1 shows a schematic block diagram structure that could be utilized to implement interrupt handling with an access protection mechanism.

FIG. 1 shows a schematic block diagram structure that could be utilized to implement interrupt handling with an access protection mechanism.

An interrupt router (IR) 101, also referred to as slave, comprises at least one service request node (SRN) 102. Each SRN 102 may be arranged to handle a dedicated interrupt event 105 via an arbitration unit 103 and an interrupt control unit (ICU) 104. The ICU 104 provides an interrupt service request (SR) 106 to an interrupt service provider (ISP) 107. These features (e.g., 101, 102, 103, 104, 107) may be included on an integrated circuit, which typically includes one or more semiconductor substrate(s) in which semiconductor devices such as transistors are disposed, and an interconnect structure including copper wires and vias that connect the semiconductors devices to one another to achieve a circuit configuration. The integrated circuit may also include one or more CPU(s) or DMA unit(s).

The ISP 107 may be a piece of hardware that can run a safe application and/or a secure application. The ISP 107 may comprise, e.g., a CPU or a DMA unit. At least one virtual machine (VM) may be run on (at least) one CPU.

The IR 101 also comprises a slave interface 110 that is used for configuring the at least one SRN 102. Such configuration is provided by the ISP 107 via a bus 111 and it may setup a service control register (SRC) 108 of the SRN 102. The SRC 108 may comprise several entries that can be configured as will be described later. The bus 111 may also disposed on the same integrated circuit as 101, 102, 103, 104, 107, and can include a plurality of conductive wires extending between a first bus connection interface (e.g., a master interface in ISP 107) and a second bus connection interface (e.g., a slave interface 110 in IR 101).

As an option, several ISPs may access the slave interface 110 via the bus 111.

Figure 2:
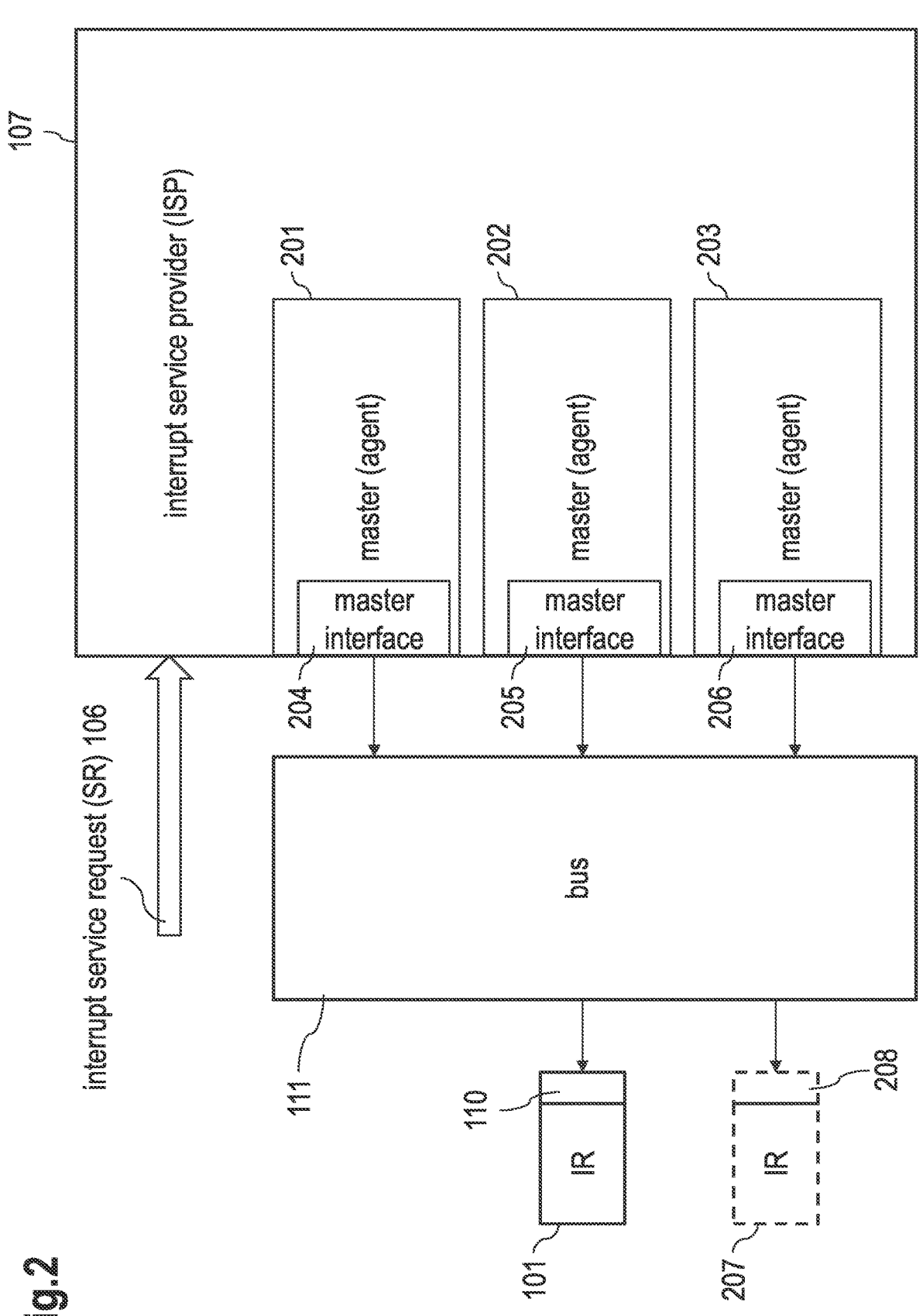
FIG. 2 shows an exemplary portion of the implementation of the interrupt service provider (ISP) comprising several master agents, wherein each master agent is connected to the interrupt router (IR)

FIG. 2 shows an exemplary portion of the implementation of the ISP 107 comprising several master agents 201 to 203, wherein each master agent 201 to 203 has a master interface 204 to 206, which is connected to the slave interface 110 of the IR 101 via the bus 111. FIG. 2 shows an additional IR 207 with a slave interface 208 that could also be addressed by the master agents 201 to 203. This IR 207 may have a structure similar to the IR 101 and it could also be accessed by the ISP 107 via the bus 111.

The SRN 102 comprises the SRC 108, which may comprise the following entries: a security bit (CS-bit), also referred to as "security information"; a type of service field (TOS-field); an address information that helps identify the target, e.g. the ISP or a VM, DMA channel or DMA channel group within the ISP, e.g., a number of a CPU and/or VM or a number of a DMA channel (or DMA channel group); and an enable/disable flag (e.g., an indicator), a service request priority number (SRPN).

The enable/disable flag is used to enable or disable the SRN. A disabled SRN cannot forward a received interrupt event to the ISP.

The SRN 102, e.g. the SRC 108 of the SRN 102, may be configured by any of the master agents 201 to 203.

Hereinafter, the master agent 203 is exemplarily picked as master agent accessing the SRN 102 via the bus 111. If the master agent 203 is determined to be a "secure master" (which will be described in detail later), e.g. if the master agent 203 is authorized to be the secure master, it is able to set or clear the security bit (under certain conditions as is explained herein). This allows the secure master to take over control of a SRN that is not yet assigned to a non-secure application. The IR 101 or the SRN 102 may be arranged to determine whether or not the master agent 203 is a secure master (can be treated or authenticated as secure master).

It is noted that any of the masters 201 to 203 adopt the role of either a secure master or a non-secure master.

The TOS-field is used to set a relationship between the SRN 102 and the ISP 107.

The address information may contain a VM number indicating a number of a virtual machine of a particular CPU of the ISP addressed. If the ISP 107 is a DMA unit, the SRPN may be used to indicate the number of the DMA channel or the number of the group of DMA channels.

The output of the SRN 102 is connected via the arbitration unit 103 to the ICU 104. The ICU 104 conveys the SR 106 to the ISP 107.

One SRN 102 can be associated with at least one ISP 107, in particular with more than one ISPs. It is noted that the IR 101 may comprise several SRNs, wherein each SRN may be connected (via the arbitration unit 103) to at least one ICU 104.

The ICU 104 sends a winning SR 106 (the winning has been decided by the arbitration unit 103 based on, e.g., the priority of a pre-defined priorization) to the respective ISP 107. The SR 106 may contain the security bit (CS-bit), which is then processed at the ISP 107.

The SR 106 may be a pending interrupt request for the ISP 107. The IR 101 converts the interrupt event 105 into the SR 106 by adding information. The added information may comprise at least one of the following: a service request priority number (SRPN), which may also be used to address the channel number of a DMA channel; a service request target (which may be an ISP), identified by, e.g., a type of service (TOS) field; and/or a virtual machine information if the target is a CPU that supports virtualization.

The SRPN defines the priority of the SR 106 with respect to other sources requesting service from the same ISP, and with respect to the priority of the ISP itself.

The arbitration unit 103 may in particular arbitrate pending interrupt requests that are mapped to a single ISP 107. The arbitration may be won by the interrupt request with the highest priority, which is then signaled by the ICU 104 to the related ISP 107.

The ICU 104 may be realized as an interface between the IR 101 and the ISP 107 over which the winning SR 106 of the recent arbitration is signaled to the ISP 107 and the ISP 107 may signal back an acknowledgement to clear the related SR 106 in the IR 101.

The IR 101 may comprise one SRN 102 per interrupt event 105. The TOS-field allows mapping of an SRN 102 to exactly one ISP 107. The SRN 102 includes the SRC 108 to configure the SRN 102.

Via the SRC 108, the interrupt associated with the SRN 102 can be enabled/disabled, mapped to an ISP (CPU, VM, DMA), and/or configured with an interrupt priority (SRPN).

The SRPN may be used by the arbitration unit 103 of the IR 101 to arbitrate between pending interrupts that are destined for the same ISP 107.

At the SRN 102, the interrupt can be marked as non-secure (CS=0) or secure (CS=1) enabling a secure domain and a non-secure domain. The non-secure domain may be a safety domain. The SRPN can be used by the arbitration unit 103 to prioritize the interrupt. The ISP 107 receives the interrupt via the ICU 104 and checks whether its internal security bit status corresponds to the CS value obtained by the SR 106.

For example, the ISP 107 may be a DMA unit comprising several DMA channels, wherein a particular channel of the DMA unit can be addressed via the SRPN field. If the value of the security bit of this DMA channel stored at the ISP 107 is identical to the value of CS-bit obtained for this DMA channel via the SR 106, the interrupt handling is initiated. If these values are different from each other, a predefined action is triggered, e.g., an alarm notification is issued and/or the interrupt is dismissed.

In another example the ISP 107 may be a CPU comprising several VMs, wherein a particular VM can be addressed via the address information field. If the value of the security bit of this VM stored at the ISP 107 is identical to the value of CS bit obtained for this VM via the SR 106, the interrupt handling is initiated. If these values are different from each other, a predefined action is triggered, e.g., an alarm notification is issued and/or the interrupt is dismissed.

The ISP 107 may be (or comprise) at least one of the following (on-chip) functions (which may also be regarded as functional blocks): a central processing unit (CPU); a virtual machine (VM) on a CPU (there may be more than one VMs per CPU); a parallel processing unit (PPU); a generic timer module (GTM); a direct memory access (DMA) unit, wherein a SR with a priority y can trigger a DMA channel v.

It is noted that each on-chip function may have at least one sub-function: For example, a DMA (function) may provide multiple DMA channels (sub-functions), which can be addressed by service requests. Accordingly, a CPU (function) may support at least one virtualization, e.g., VMs, as at least one sub-function.

The ISP may in particular be any kind of software-supported hardware or dedicated hardware that is able to react to interrupt requests.

Startup

After a reset or before an initial startup, all SRNs may be disabled. In this case, only the secure application may map an SRN to this secure application by setting the CS bit to 1 and only the non-secure application may map an SRN to this non-secure application by setting the CS bit to 0.

Accordingly, only the secure application can modify the configuration of the SRN that has already been mapped to this secure application. This applies accordingly for the non-secure application.

It is another option, however, that the configuration can be conducted via the access protection, which is allowed reading and modifying the SRN configuration; however, the modification via the access protection may be subject to configuration.

An allocation during startup may comprise at least one of the following:

An assignment of DMA resources (DMA channels, DMA channel groups) to applications. DMA channels or DMA channel groups may store predefined master IDs to enable different secure masters and thus separate access protection mechanisms so that DMA channel configuration registers and an access of the channels to the system interconnect can be assigned to the individual applications.

An assignment of CPU resources (CPUs, Virtual Machines of CPUs) to the applications. Here, CPUs and the Virtual Machines may store predefined master IDs to enable different secure masters and thus separate access protection mechanisms so that they can be assigned to the individual applications.

Co-Existence of Secure and Non-Secure Functions

Problems regarding safety and security may arise when secure functions and non-secure functions use a common platform, e.g., a common MCU.

In addition, the complexity of a secure function may change over time depending on, e.g., altering use-cases. For example, a secure application may require an increasing (or decreasing) number of on-chip resources (computer-on-modules (COMs), system functions, DMA channels, and/or interrupts): This may advantageously trigger a different allocation of on-chip resources with, e.g., COMs, DMA channels, CPUs, virtual machines and/or corresponding interrupt nodes for the secure application.

Unwanted interference between secure and non-secure applications should be avoided. Hence, a functional encapsulation of secure applications and non-secure applications may have to be guaranteed. For example, on-chip functions like interrupt nodes or DMA channels that are assigned to an application of a secure domain should not be accessible by an application of a non-secure domain. Such access limitation shall in particular cover any configuration as well as re-configuration. Also, it should be guaranteed that one application cannot assign on-chip functions like interrupt nodes or DMA channels to the other application.

A secure application may not trust a non-secure application. Therefore, an assignment of secure functions and interrupts must be protected against reconfiguration by the non-secure application. Also, the non-secure (e.g., safe) application may not trust the secure application, e.g., if the secure application has a low Automotive Safety Integrity Level (ASIL).

Also, it is an option to detect if an interrupt is (re-)mapped to the secure application by the non-secure application. Further, the non-secure application may have to be able to detect if the interrupt was mapped to it by a secure application.

Hence, the secure application, the assignment of functions to the secure application (e.g., configuration) and the functions assigned to it shall be protected from an interference of a non-secure application and vice versa.

Since on-chip resources such as DMA modules and interrupt systems are costly, it is a motivation to not duplicate them, but implement shared resources for secure applications and non-secure applications.

Examples described herein in particular refer to an interrupt system that may implement the following features:

(1) The secure application marks interrupts as secure so that they cannot affect non-secure application.

(2) The secure application (DMA channels, CPUs, virtual machines assigned to the secure application) detects if an interrupt that is addressed to the secure application is a non-secure interrupt (thereby revealing potential attacks).

(3) The non-secure application (DMA channels, CPUs, virtual machines assigned to the safe application) detects if an interrupt that is addressed to the non-secure application is a secure interrupt, which might be a potential failure in case the secure application has a lower ASIL.

It is noted that herein two applications/functions are described: secure applications and non-secure applications. The secure application may be subject to some level or requirement of security, whereas the non-secure application is directed to a different domain, which may be safety or any other domain different from security.

Examples described herein suggest that an interrupt is mapped to a secure application in a secure way through an interrupt system and that secure applications and non-secure applications can be handled by the same hardware without interfering interrupts.

An application may be or comprise a piece of software that is mapped to on-chip resources (e.g., CPUs, DMA, interfaces, SRAM, interrupts related to the CPUs/DMA/interfaces etc.). There may exist secure applications and non-secure applications.

The secure application may configure a particular SRN (interrupt node) as secure. The non-secure application may configure a particular (different) SRN as non-secure. Each SRN is associated with one interrupt event. The SRN is associated with a secure application, a non-secure application or it is not yet associated with any application at all.

The configuration of the SRN is controlled in order to avoid that the secure application interferes with the non-secure application and vice versa. This can be achieved by a control mechanism implementing the following rules:

(a) Only the secure master can assign interrupt nodes to the secure application.

(b) The non-secure application cannot assign interrupts to the secure application.

(c) The non-secure application cannot modify SRNs that are assigned by the secure application and therefore marked as secure and vice versa.

(d) A master agent that is not the secure master can assign interrupt nodes to the non-secure application.

(e) The secure master cannot assign interrupts to the non-secure application.

(f) The secure application cannot modify an SRN that is assigned to the non-secure application and therefore marked as non-secure.

These rules prevent any non-secure application from changing the configuration (e.g., mapping to the ISP and/or priority) of a secure SRN. Furthermore, the secure application is able to detect if an interrupt has been mapped from a non-secure application to the secure application.

It is noted that above the write access protection rules are listed. It is an option, however, that also the read access protection rules can be subject to configuration: With such read access protection rules it can be defined, e.g., which master is enabled to read the secure SRNs, etc. This could be useful for, e.g., a debug interface that needs access to various types of information.

Figure 3:
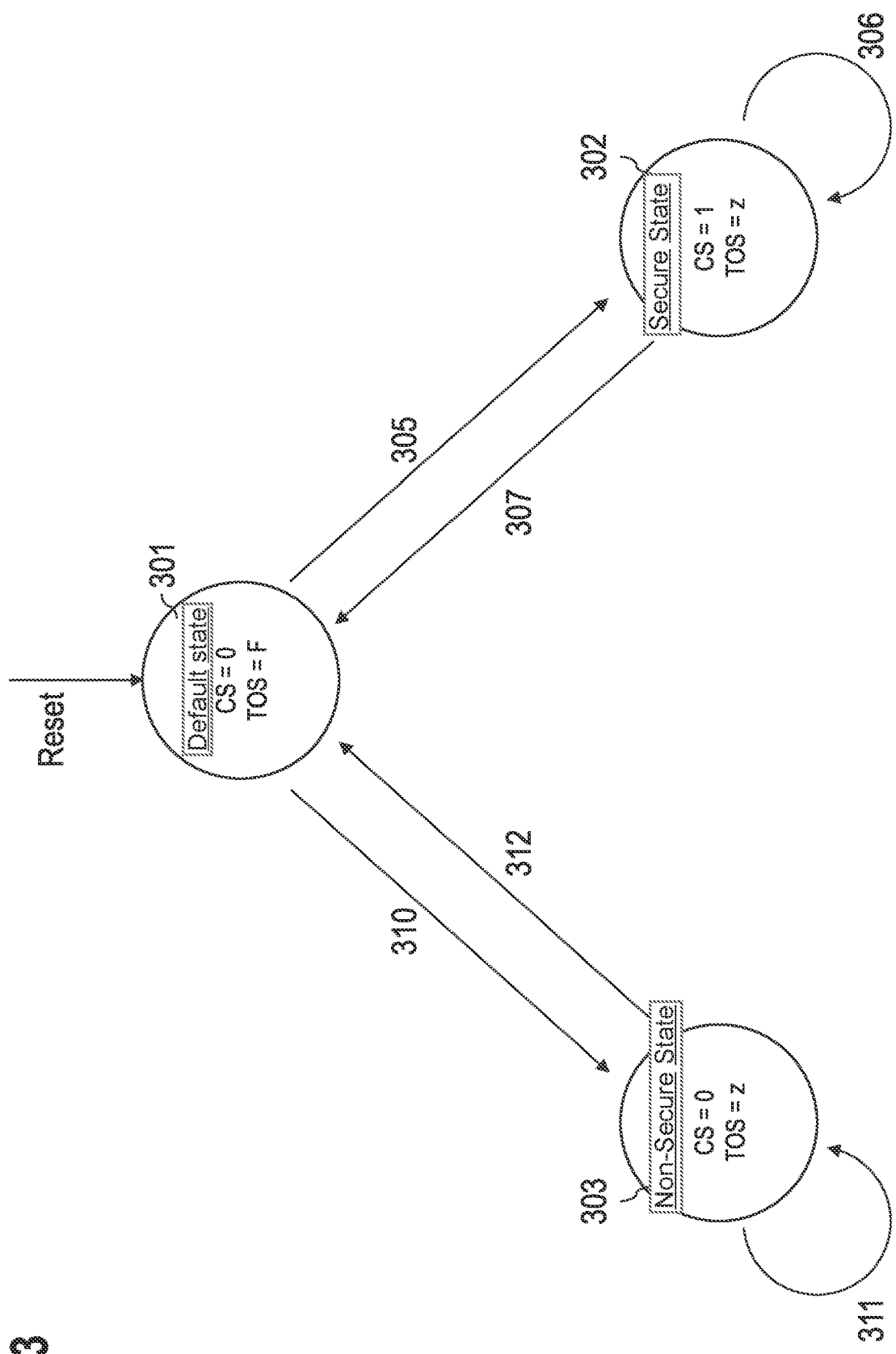
FIG. 3 shows an exemplary state diagram visualizing the various states of the secure bit (CS-bit) of the service request node (SRN).

FIG. 3 shows an exemplary state diagram visualizing the various states of the secure bit (CS-bit) of the SRN 102.

After reset, a state 301 is entered. In this state 301, the CS-bit is 0 by default. Also, the SRC has a type of service field (TOS-field) that can be set to a number z that indicates a mapping to a particular ISP that is associated with the value z. In the state 301, no such mapping applies and the TOS-field is set to a predefined value F (which is different from any value used for a mapping to an actual ISP). In other words, the value F in the TOS-field indicates that no ISP is associated with this particular SRN.

Transition 305

A transition from the state 301 (default state) to a state 302 (secure state) may occur if the following conditions are met:

(S1) A master agent that initiates such transition from state the 301 to the state 302 needs to be the secure master. This can be determined by the IR based on an identification conveyed by the master agent to the IR. The IR may then determine whether this identification is valid and authenticates the master agent as secure master (e.g., by comparing the identification with an entry in a persistent table that comprises identifications of master agents that are secure masters).

(S2) The secure master (e.g., the master agent that has been determined by the IR to be the secure master in (S1) before) sets the CS-bit to 1 (if TOS=F) and the TOS-field to a value z indicating a mapping to a particular ISP.

Transition 306

A transition from the state 302 to the state 302 (remaining in the secure state) may occur if a different value z* is written to the TOS-field indicating a mapping to a different ISP. It is noted that such transition also requires that the initiating master agent is a secure master as described in (S1) above and that the CS-bit remains to be set to 1.

Transition 307

A transition from the state 302 back to the state 301 may occur if the initiating master agent is a secure master as described in (S1).

(S3) In addition, the secure master sets the CS-bit to 0 and the TOS-field to the value F indicating no mapping to a particular ISP.

Transition 310

A transition from the state 301 to a state 303 (non-secure state) may occur if the following conditions are met:

(N1) A master agent that initiates such transition from state the 301 to the non-secure state 303 is not a secure master. This can be determined as described under (S1) above: The IR determines whether the master agent's identification is associated with a secure master. If it is not, it is not a secure master.

(N2) The master agent (which is not a secure master) sets the CS-bit to 0 and the TOS-field to a value z indicating a mapping to a particular ISP. It is noted that the value z used here and in (S2) may be different.

Transition 311

A transition from the state 303 to the state 303 (remaining in the non-secure state) may occur if a different value z* is written to the TOS-field indicating a mapping to a different ISP. It is noted that such transition also requires that the initiating master agent being a non-secure master as described in (N1) above and that the CS-bit remains to be set to 0. It is noted that the value z* used here and in transition 306 may be different.

Transition 312

A transition from the state 303 back to the state 301 may occur if the initiating master agent is a non-secure master as described in (N1).

(N3) In addition, the non-secure master sets the CS-bit to 0 and the TOS-field to the value F indicating no mapping to a particular ISP.

Hence, the transitions 305, 306 and 307 can only be conducted by a master agent that is a secure master. On the other hand, the transitions 310, 311 and 312 can only be conducted by a master agent that is not a secure master. This allows a separation of the secure domain from any other domain, e.g., a safety domain.

The secure bit (CS-bit) of the SRN 102 can only be changed by the secure master. In other words, any master agent that is not identified as a secure master by the SRN, must neither set the CS-bit nor clear the CS-bit.

To initiate a transition from the state 301 to the state 303, a non-secure master must set the secure bit CS=0 (preferably in the same write access to the SRN register). To initiate a transition from the state 301 to the state 302, the secure master must set the secure bit CS=1 (preferably in the same write access to the SRN register).

The secure master is not able to modify the SRN in state 303, because it is already assigned to the non-secure application (TOS!=F and CS=0). Therefore, in this example, a direct transition from the state 301 to the state 302 and vice versa is not possible Determining Whether a Master Agent is a Secure Master or not:

Any of the master agents 201 to 203 may convey via the bus 111 a master ID to the IR 101 (via the slave interface 110). The IR 101 and/or the SRN 102 may determine whether or not this master ID is associated with a secure master and that therefore this master agent becomes authenticated as secure master.

This can be achieved by comparing the master ID with an entry in a table or any storage means, locally or remotely. If it is confirmed that the master ID corresponds to an ID that is stored in the table comprising the secure master IDs, this master agent is allowed to set or clear the CS-bit and utilize the SRN 102 as described above.

It is noted that the secure master role may be determined for the IR 101 or for each SRN 102 within the IR 101.

It is noted that the table may be stored with the IR 101 and/or with the SRN 102. Also, authenticating the master agent as secure master may be done by the IR 101 and/or the SRN 102.

It is further noted that the authentication of the secure master as described also allows authenticating a non-secure master (if there is no entry for the master ID of the master agent in the table comprising the secure master IDs).

As an option, the table may comprise master IDs of secure masters and/or non-secure masters. In this use-case, it may be another option that a master agent with a master ID that cannot be found in the table, is neither authenticated as secure master or as non-secure master and may hence not allowed to configure the SRN.

As an alternative, instead of determining the secure master based on the master ID, a sideband signal can be used to determine (i) which master agent is entitled to act as a secure master and/or (ii) for (directly) configuring the SRN, in particular the SRC of the SRN.

Interrupt Processing

FIG. 1 also shows how an actual interrupt is being processed: The interrupt event 105 is processed by the IR 101, e.g., the SRN 102, the arbitration unit 103 and the ICU 104. As a result, the pending interrupt may be signaled by the IR 101 as SR 106 together with the secure bit towards the associated ISP 107.

It is noted that the SR 106 may comprise the interrupt event 105 or any information that is generated based on the interrupt event 105 comprising, e.g., a priority, a service request target and the security bit (CS-bit). Based on the value of the CS-bit, the SR 106 may be a secure SR or a non-secure SR.

It is further noted that the "secure bit" as stated herein may also comprise any information ("secure bit information") that allows determining (e.g., setting, re-configuring) the secure bit.

Functions used in the ISP 107 may be assigned to a secure application or to a non-secure application (also during operation). If the ISP is a DMA function, a DMA channel may be assigned individually or in groups to a secure application or to a non-secure application. If the ISP is a CPU with virtualization, the CPU's virtual machines (VMs) can each be assigned to a secure application or to a non-secure application.

The ISP may check if the secure bit of the received SR matches the secure status stored at the ISP:

If a secure DMA channel is triggered by a non-secure SR, the interrupt trigger event is ignored. Optionally, an error event may be issued towards the secure application (allowing detection of a potential attack).

If a secure CPU or a secure VM on this CPU is triggered by a non-secure SR, the interrupt is ignored. Optionally, an error event may be issued towards the secure application (allowing detection of a potential attack).

Configuration of the SRC by the Master Agent

The exemplary master agent 204 via the bus 111 conveys data from the ISP 107 to the slave interface 110 of the IR 101. The IR 101 parses this data to the SRN 102 for setting the SRC 108.

For example, the data conveyed from the master agent may comprise an access address, a type of transaction (write/read), the master ID of the master agent, and/or an information whether the interrupt is in the secure domain or in the non-secure domain (for example, an additional information may have to be provided indicating that an access is directed to a secure application).

The system interconnect may provide a system address map with registers and memories that can be accessed through this system interconnect (e.g., the IR control registers). The address map comprises addresses and/or address regions (SRAMs). A secure master may start a transaction with an address phase conveying the address within the system address map which the secure master would like to access.

As described above, the master agent may be authorized based on its master ID, e.g., the IR 101/the SRN 102 is able to determine whether or not the master agent is entitled the role of a secure master.

The access address may comprise an identification (e.g., address) of a CPU or VM, which is subject to configuration. Exemplary Interrupt Processing/SR Processing at the ISP Examples for ISPs are CPUs, DMAs or VMs running on at least one CPU.

The assignment of DMA channels or DMA channel groups to a secure application or to a non-secure application can be done in the DMA module as described above for the assignment of the SRN. The assignment of virtual machines of a CPU to the secure application or non-secure application can also be done in the CPU as described above for the assignment of the SRN.

Advantageously, the approach presented allows a flexible mapping of on-chip resources such as CPUs, VMs, DMA channels and functional blocks with their interrupts to a secure application or to a non-secure and safe applications. The solution may in particular be applied to MCUs that support an integration of secure as well as non-secure applications.

After reset, DMA channels and/or DMA channel groups may be disabled. Each DMA channel or DMA channel group has a security bit to indicate whether the DMA channel/DMA channel group is secure (CS=1) or non-secure (CS=0). As an option, at least one DMA channel and/or DMA channel group may be predefined as secure.

What is claimed is:

1. A method for processing of an interrupt event, comprising:
   receiving an interrupt event at a service request node, the service request node being a portion of an integrated circuit arranged on a semiconductor substrate,
   providing, by the service request node, an interrupt service request based on the interrupt event, and a security information, wherein the security information indicates whether the service request node operates in a secure domain, the service request node operates in a non-secure domain, or the service request node is not yet configured; and
   forwarding the interrupt service request to an interrupt service provider, the interrupt service provider included on the integrated circuit.

2. The method of claim 1, wherein the security information of the service request node is configured by a master agent.

3. The method according to claim 2,
   wherein the configuration in the secure domain can only be conducted by a master agent that has been authenticated as a secure master agent.

4. The method according to claim 2,
   wherein the configuration in the non-secure domain can only be conducted by a master agent that is not a secure master agent.

5. The method according to claim 1, wherein the interrupt service request is further provided based on an additional information that may include at least one of the following:
   a priority information; and
   an address information that allows identification of the interrupt service provider, the address information identifying at least one of
   a master agent of the interrupt service provider,
   a processor,
   a virtual machine, or
   a DMA channel or a DMA channel group.

6. The method according to claim 1, wherein the interrupt service provider only processes the interrupt event when the security information of the interrupt service request corresponds to an internal security information.

7. The method according to claim 1, wherein the interrupt event is associated with one service request node and the service request node is associated only with the interrupt event.

8. An integrated circuit, comprising:
   an interrupt service provider circuit comprising a master agent circuit; and
   an interrupt router circuit including a service request node having a service control register configured to store a security bit; and
   wherein the master agent circuit, when authorized as a secure master, is configured to set or clear the security bit; and
   wherein the interrupt router circuit is configured to receive an interrupt event that does not include the security bit and, based on the interrupt event, is configured to provide an interrupt service request that includes the security bit to the interrupt service provider circuit; and
   wherein the interrupt service provider circuit has another security bit stored within the interrupt service provider circuit, and wherein the interrupt service provider circuit is configured to perform a comparison between the security bit in the interrupt service request with the another security bit stored within the interrupt service provider circuit, and trigger a predefined action based on the comparison.

9. The integrated circuit of claim 8, wherein the predefined action comprises triggering an alarm or dismissing the interrupt service request.

10. The integrated circuit of claim 8, wherein after a reset operation, the security bit is initialized to a first state, and the security bit is set or cleared to a second state by the master agent circuit when the master agent circuit is authorized as the secure master.

11. The integrated circuit of claim 8, wherein the service control register is further configured to store a type-of-service field (TOS-field).

12. The integrated circuit of claim 11, wherein the secure master is configured to set the TOS-field to a first predetermined value to indicate that no interrupt service provider circuit is associated with the service request node.

13. The integrated circuit of claim 12, wherein the secure master is configured to set the TOS-field to a second predetermined value to indicate that the interrupt service provider circuit is associated with the service request node.

14. The integrated circuit of claim 13, wherein the security bit is set based on the TOS-field.

15. The integrated circuit of claim 8, wherein the interrupt service provider circuit comprises a DMA channel.

16. A device, comprising:
   an interrupt service provider; and a service request node configured to receive an interrupt event; and generate an interrupt service request that includes indication of the interrupt event and security information that indicates whether the service request node operates in a secure domain, the service request node operates in a non-secure domain, or the service request node is not yet configured; and provide the interrupt service request to the interrupt service provider.

17. The device of claim 16, wherein the interrupt service provider comprises a master agent configured to configure the security information, wherein configuration in the secure domain can only be conducted by a master agent that has been authenticated as a secure master agent and the configuration in the non-secure domain can only be conducted by a master agent that is not a secure master agent.

18. The device of claim 16, wherein the interrupt service request includes additional information that may include at least one of the following:

a priority information; and an address information that allows identification of the interrupt service provider, the address information identifying at least one of a master agent of the interrupt service provider, a processor, a virtual machine, or a DMA channel or a DMA channel group.

19. The device of claim 16, wherein the interrupt service provider refrains from processing the interrupt event when the security information of the interrupt service request does not correspond to an internal security information.

20. The device of claim 16, wherein the interrupt event is associated with one service request node and the service request node is associated only with the interrupt event.

* * * * *